United States Patent
Ito et al.

(10) Patent No.: US 11,050,448 B2
(45) Date of Patent: Jun. 29, 2021

(54) WIRELESS COMMUNICATION DEVICE

(71) Applicant: Murata Manufacturing Co., Ltd., Kyoto-fu (JP)

(72) Inventors: Kenichi Ito, Nagaokakyo (JP); Masashi Omuro, Nagaokakyo (JP); Yu Ishiwata, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 16/886,422

(22) Filed: May 28, 2020

(65) Prior Publication Data
US 2020/0295792 A1    Sep. 17, 2020

Related U.S. Application Data

(63) Continuation of application No. PCT/JP2018/041483, filed on Nov. 8, 2018.

(30) Foreign Application Priority Data

Nov. 30, 2017   (JP) .............................. JP2017-230383

(51) Int. Cl.
   *H04B 1/10*   (2006.01)
(52) U.S. Cl.
   CPC ...................................... *H04B 1/10* (2013.01)
(58) Field of Classification Search
   CPC ... H04B 1/10; H04B 1/18; H04B 1/40; H03H 7/0115
   See application file for complete search history.

(56) References Cited

U.S. PATENT DOCUMENTS

| | | | |
|---|---|---|---|
| 5,850,166 A * | 12/1998 | Katoh | H03H 9/0542 333/189 |
| 6,614,837 B1 * | 9/2003 | Abdelgany | H04B 1/04 375/211 |
| 2004/0171352 A1 * | 9/2004 | Maeda | H04B 1/10 455/67.13 |
| 2004/0248526 A1 | 12/2004 | Narita et al. | |

(Continued)

FOREIGN PATENT DOCUMENTS

| | | |
|---|---|---|
| CN | 1579048 A | 2/2005 |
| JP | H04302553 A | 10/1992 |

(Continued)

OTHER PUBLICATIONS

International Search Report issued in PCT/JP2018/041483; dated Jan. 15, 2019.
International Preliminary Report on Patentability and Written Opinion issued in PCT/JP2018/041483; dated Jun. 2, 2020.
An Office Action mailed by the Korean Intellectual Property Office dated Apr. 3, 2021, which corresponds to Korean Patent Application No. 10-2020-7015056 and is related to U.S. Appl. No. 16/886,422 with English Language translation.

*Primary Examiner* — Lewis G West
(74) *Attorney, Agent, or Firm* — Studebaker & Brackett PC

(57) ABSTRACT

A receiver device includes an antenna that receives a high frequency signal having a bandwidth, a mixer connected to the antenna and a frequency multiplier. A filter that removes a noise signal whose frequency is different from that of the local signal is provided between the local oscillator and the frequency multiplier. The filter removes the noise signal that satisfies the condition that the absolute value of the frequency difference between the center frequency of the local signal and the center frequency of the noise signal is less than the bandwidth of the high frequency signal.

12 Claims, 5 Drawing Sheets

(56) References Cited

U.S. PATENT DOCUMENTS

| | | | |
|---|---|---|---|
| 2005/0186935 A1* | 8/2005 | Kawama | H04B 1/30 455/334 |
| 2012/0306593 A1* | 12/2012 | Kidoh | H03H 9/0576 333/186 |
| 2014/0141738 A1* | 5/2014 | Janesch | H04B 1/18 455/192.2 |
| 2016/0173215 A1* | 6/2016 | Laaser | H04B 15/06 370/201 |
| 2016/0233869 A1* | 8/2016 | Khoury | H04J 3/06 |
| 2016/0365890 A1* | 12/2016 | Reynolds | H04B 1/10 |
| 2017/0063519 A1* | 3/2017 | Fang | H04B 10/503 |
| 2017/0180000 A1 | 6/2017 | Yensen et al. | |
| 2019/0200303 A1* | 6/2019 | Nakahara | H04B 1/10 |
| 2021/0036409 A1* | 2/2021 | Ohno | H01Q 5/371 |

FOREIGN PATENT DOCUMENTS

| | | |
|---|---|---|
| JP | H10163918 A | 6/1998 |
| JP | 2003179513 A | 6/2003 |
| JP | 2004274610 A | 9/2004 |
| JP | 2009010604 A | 1/2009 |
| JP | 2012222817 A | 11/2012 |
| JP | 2014195168 A | 10/2014 |
| KR | 10-2010-0069485 A | 6/2010 |

* cited by examiner

WIRELESS COMMUNICATION DEVICE

CROSS-REFERENCE TO RELATED APPLICATIONS

This application claims benefit of priority to International Patent Application No. PCT/JP2018/041483, filed Nov. 8, 2018, and to Japanese Patent Application No. 2017-230383, filed Nov. 30, 2017, the entire contents of each are incorporated herein by reference.

BACKGROUND

Technical Field

The present disclosure relates to wireless communication devices suitable for use with high frequency signals such as, for example, microwaves, millimeter waves, and the like.

Background Art

As a wireless communication device for use with high frequency signals, a receiver device including an antenna, a mixer, a multiplier, and a local oscillator is well known in the art, as described, for example, in Japanese Unexamined Patent Application Publication No. 2014-195168. In a receiver device described in Japanese Unexamined Patent Application Publication No. 2014-195168, a local signal output from a local oscillator is multiplied in frequency by a multiplier and input to a mixer, and a high frequency signal received by an antenna is input to the mixer. At this time, the mixer mixes a signal from the multiplier and a high frequency signal, and a high frequency signal down-converted or up-converted is output.

SUMMARY

In the receiver device described in Japanese Unexamined Patent Application Publication No. 2014-195168, the multiplier multiplies the local signal generated by the local oscillator in frequency. On the other hand, a noise signal may sometimes enter into, for example, a signal path between the multiplier and the local oscillator. In this case, when the multiplier multiplies a local signal mixed with the noise signal in frequency, intermodulation occurs in the multiplier, and an unwanted noise spectrum is generated as higher order intermodulation distortions. In the case where the signal including this unwanted noise spectrum is input to the mixer and combined with a high frequency signal received from the antenna, a noise band may sometimes overlap with an original communication signal band. Further, in the case where this composite signal is input to a demodulation circuit on the receiving side, the signal may be determined as error data, and this may pose a problem of disrupting the data communication.

The present disclosure is made in view of the prior art technology described above, and provides a wireless communication device that suppresses the intermodulation distortion of a frequency multiplier to prevent the occurrence of noise.

The present disclosure provides a wireless communication device including an antenna that transmits or receives a high frequency signal having a preset bandwidth; a local oscillator that outputs a local signal, a center frequency of the local signal being lower than that of the high frequency signal; and a frequency multiplier that multiplies the local signal in frequency. The frequency multiplier is electrically connected to the local oscillator. The wireless communication device further includes a mixer connected to the antenna and the frequency multiplier. A filter is provided between the local oscillator and the frequency multiplier. The filter allows the local signal to pass and removing a noise signal whose frequency is different from that of the local signal, and the filter removes the noise signal that satisfies a condition that an absolute value of a frequency difference between the center frequency of the local signal and the center frequency of the noise signal is less than the bandwidth of the high frequency signal.

According to the present disclosure, the filter that removes the noise signal whose frequency is different from that of the local signal is provided between the local oscillator and the frequency multiplier. Therefore, the frequency multiplier only multiplies in frequency the local signal from which the noise signal is removed, and this enables to suppress intermodulation distortions of the frequency multiplier and prevent the occurrence of noise.

Further, in the case where the frequency multiplier multiplies the local signal in frequency, in which the noise signal is mixed, an unwanted noise spectrum is generated. In this case, when the absolute value of the frequency difference between the center frequency of the local signal and the center frequency of the noise signal is less than the bandwidth of the high frequency signal, based on the unwanted noise spectrum output from the frequency multiplier, noise is further generated in an output from the mixer, and a noise band overlaps a band of the high frequency signal. This point is not limited to the mixer on the receiving side that performs down-conversion, and the same applies to the mixer on the transmitting side that perform up-conversion.

Whereas, the filter removes the noise signal that satisfies the condition that the absolute value of the frequency difference between the center frequency of the local signal and the center frequency of the noise signal is less than the bandwidth of the high frequency signal. This prevents a communication signal band from overlapping the noise band.

DETAILED DESCRIPTION

Hereinafter, a wireless communication device according to embodiments of the present disclosure will be described in detail with reference to the accompanying drawings.

Figure 1:
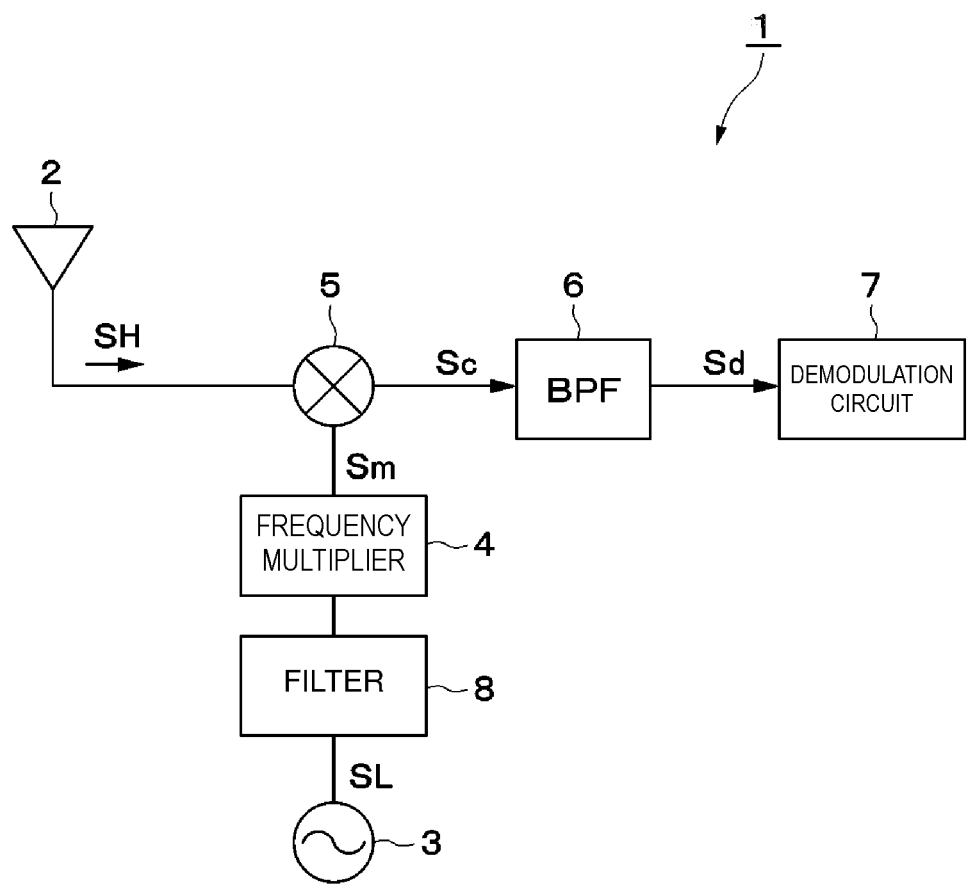
FIG. 1 is a block diagram illustrating a receiver device according to a first embodiment of the present disclosure.

FIG. 1 illustrates a receiver device 1 as a wireless communication device according to a first embodiment of the present disclosure. A receiver device 1 includes an antenna 2, a local oscillator 3, a frequency multiplier 4, a mixer 5, a demodulation circuit 7, a filter 8, and the like.

The antenna 2 receives a high frequency signal SH having a preset bandwidth X. The antenna 2 is connected to the mixer 5. The center frequency FH of the high frequency signal SH is set at, for example, 3 GHz. Further, the bandwidth X is set at, for example, 300 MHz. The antenna 2 inputs the high frequency signal SH to the mixer 5. Note that the antenna 2 is not necessarily directly connected to the mixer 5 and may be indirectly connected via, for example, a low-noise amplifier or a band pass filter.

The local oscillator 3 outputs a local signal SL having the center frequency FL, which is lower than the high frequency signal SH. The center frequency FL of the local signal SL is set at, for example, 500 MHz. The local oscillator 3 is electrically connected to the frequency multiplier 4.

The frequency multiplier 4 outputs a signal Sm, which is obtained by multiplying the local signal SL in frequency. Specifically, the frequency multiplier 4 outputs the signal Sm whose frequency is an integer multiple of (for example, twice) the center frequency FL. This causes the center frequency Fm of the signal Sm to be set at, for example, 1 GHz. The output side of the frequency multiplier 4 is connected to the mixer 5. Note that the frequency multiplier 4 is not limited to a device that doubles the center frequency FL of the local signal SL and may also be, for example, a device that triples the center frequency FL or a device that quadruples the center frequency FL.

The mixer 5 is connected to the antenna 2 and the frequency multiplier 4. The mixer 5 combines the signal Sm output from the frequency multiplier 4 and the high frequency signal SH output from the antenna 2 and outputs a composite signal Sc. At this time, the composite signal Sc includes a down-converted signal Sd obtained by down-converting the high frequency signal SH and an up-converted signal Su obtained by up-converting the high frequency signal SH. The center frequency Fd of the down-converted signal Sd is, for example, 2 GHz, which is the value obtained by subtracting the difference between the center frequency FH of the high frequency signal SH and the center frequency Fm of the signal Sm from the center frequency FH of the high frequency signal SH. On the other hand, the center frequency Fu of the up-converted signal Su is, for example, 4 GHz, which is the value obtained by adding the difference between the center frequency FH of the high frequency signal SH and the center frequency Fm of the signal Sm to the center frequency FH of the high frequency signal SH.

The output side of the mixer 5 is connected to the demodulation circuit 7 via a band pass filter 6. The band pass filter 6 removes the unwanted up-converted signal Su from the composite signal Sc and outputs the down-converted signal Sd to the demodulation circuit 7. Therefore, the mixer 5 for receiving functions as a down-convert mixer that combines the high frequency signal SH and the signal Sm, which is obtained by multiplying the local signal SL in frequency, and outputs a low frequency signal (down-converted signal Sd), which is obtained by down-converting the high frequency signal SH. The demodulation circuit 7 includes, for example, a detector circuit, an AD converter, and the like, and demodulates a signal using the down-converted signal Sd and generates a base-band signal for receiving.

The filter 8 is provided between the local oscillator 3 and the frequency multiplier 4. The filter 8 removes a noise signal N whose frequency is different from that of the local signal SL. At this time, the filter 8 removes the noise signal N that satisfies the condition ($X > |\Delta F|$) that the absolute value of the frequency difference $\Delta F$ ($\Delta F = Fn - FL$) between the center frequency FL of the local signal SL and the center frequency Fn of the noise signal N is less than the bandwidth X of the high frequency signal SH. At this time, the noise signal N is, for example, another high frequency signal SHn to be used for wireless communication in a frequency band different from that of the high frequency signal SH. Specifically, the noise signal N is, for example, a signal in the 700 MHz band, which is a low band of Long Term Evolution (LTE).

Figure 2:
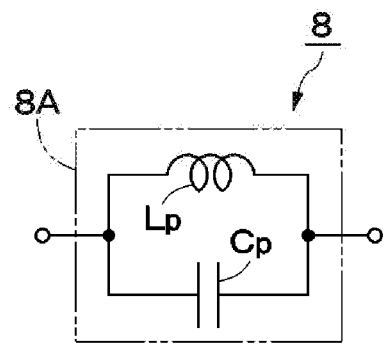
FIG. 2 is a circuit diagram illustrating a filter in FIG. 1.

As illustrated in FIG. 2, the filter 8 is made up of a band stop filter (BSF) that allows the local signal SL to pass and removes the noise signal N. The filter 8 is formed by combining an inductive element Lp and a capacitive element Cp. Specifically, the BSF of the filter 8 is made up of a parallel resonant circuit 8A in which the inductive element Lp and the capacitive element Cp are connected in parallel. At this time, a parallel resonant frequency of the filter 8 is set at, for example, 700 MHz, which is the center frequency Fn of the noise signal N (see FIG. 3).

The receiver device 1 according to the present embodiment has the configuration such as the one described above, and operation thereof is described below.

The local oscillator 3 generates, as the local signal SL, a sinusoidal wave having a single frequency (center frequency FL) of 500 MHz. The frequency multiplier 4 converts the local signal SL into the signal Sm whose frequency (center frequency Fm) is an integer multiple (for example, twice) of that of the local signal SL. At this time, the center frequency Fm of the signal Sm is 1 GHz.

Here, the mixer 5 receives the high frequency signal SH received at the antenna 2 and the signal Sm underwent the frequency conversion. The mixer 5 combines these high frequency signal SH and the signal Sm, which is obtained by multiplying the local signal SL in frequency, and outputs the composite signal Sc. At this time, the composite signal Sc includes the down-converted signal Sd and the up-converted signal Su. The center frequency Fd of the down-converted signal Sd is the value (FH−Fm) obtained by subtracting the center frequency Fm of the signal Sm from the center frequency FH of the high frequency signal SH, and is 2 GHz. On the other hand, the center frequency Fu of the up-converted signal Su is the value (FH+Fm) obtained by adding the center frequency Fm of the signal Sm to the center frequency FH of the high frequency signal SH, and is 4 GHz. Further, both the down-converted signal Sd and the up-converted signal Su have the same bandwidth X as the high frequency signal SH. Of the down-converted signal Sd and the up-converted signal Su of the composite signal Sc, the band pass filter 6 selects the down-converted signal Sd that is a signal necessary for the communication. The band pass filter 6 outputs the down-converted signal Sd to the demodulation circuit 7.

Figure 4:
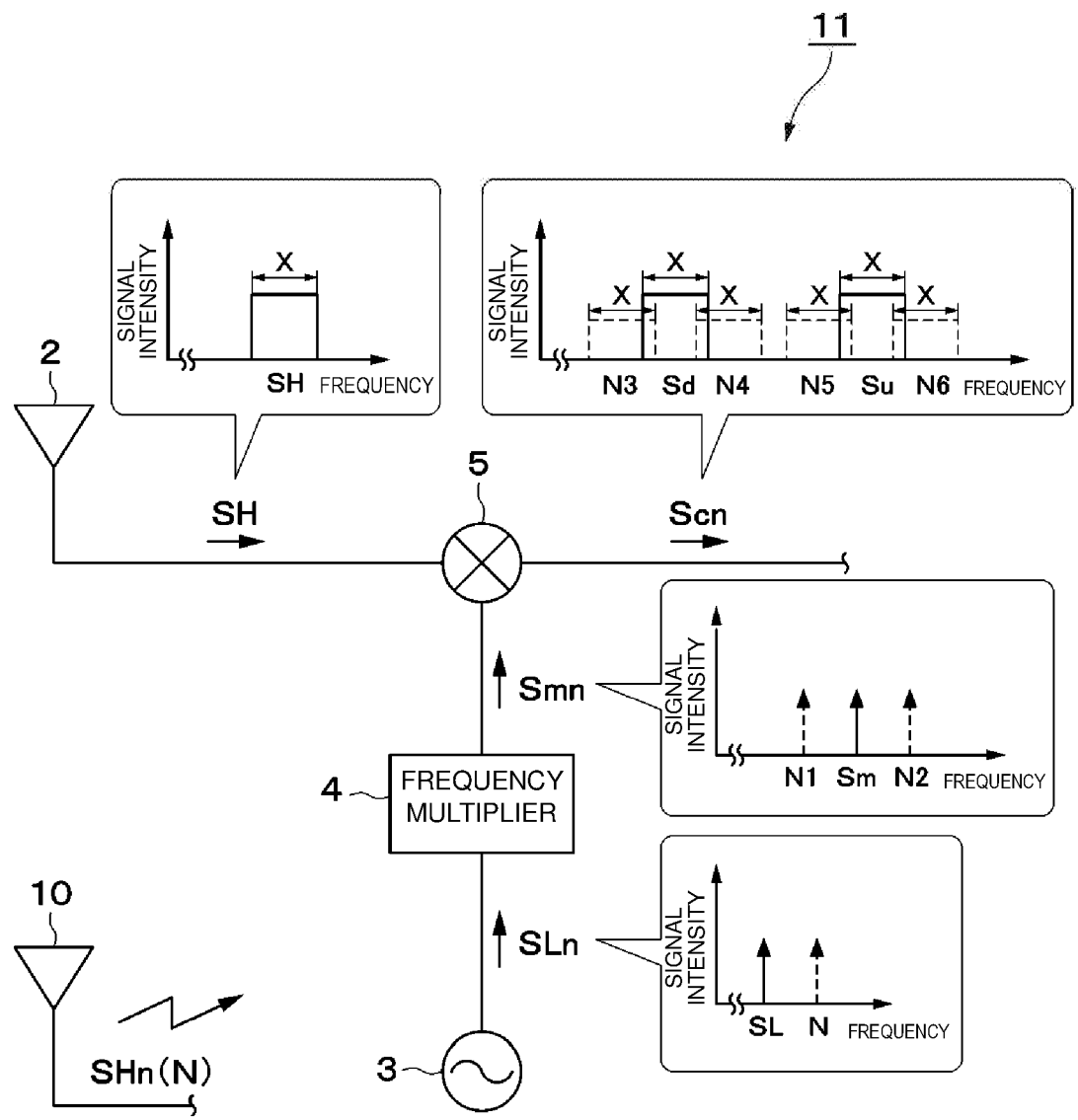
FIG. 4 is a block diagram illustrating a receiver device according to a comparison example.

In the vicinity of the wireless communication device, an antenna 10 for a wireless communication system that is different from a wireless communication system used for the antenna 2 may sometimes be installed (see FIG. 4). At this time, the antenna 10 performs wireless communication and emits radio waves, independently from the antenna 2. Therefore, the receiving of the high frequency signal SH by the antenna 2 and the emission of a radio wave (high frequency signal SHn) from the antenna 10 may sometimes occur simultaneously. Such a state is likely to happen for small wireless terminals such as, for example, smartphones.

For example, in the case of smartphones, two communication systems, wireless local area network (LAN) and LTE, are being used. Therefore, as antennas for different wireless communication systems, two antennas for the wireless LAN and LTE are included. Further, because of its small-size shape, the space for mounting the antennas is limited, and the two antennas for different communication systems are arranged close to each other. In addition, in order to secure the communication distance, each antenna emits a high-power radio wave of about several dB to 30 dB.

As described above, in smartphones, the antenna 10 for one of the wireless communication systems is arranged close to the wireless communication device using the other wireless communication system. In addition, the antennas 2 and 10 each emit a high-power radio wave. Therefore, a wireless radio wave of the antenna 10 may sometimes couple with a high frequency component of the wireless communication device, and the wireless radio wave of the antenna 10 may enter into a signal line of the local signal SL, which is a signal line between the local oscillator 3 and the frequency multiplier 4, as the noise signal N. At this time, the center frequency of the low band of LTE is 700 MHz, and the center frequency FL of the local signal SL is close to 500 MHz.

That is to say, in addition to the original local signal SL, the high frequency signal SHn (the signal of 700 MHz) emitted from the antenna 10 transmits along the signal line of the local signal SL as the noise signal N. Hereinbelow, the case where the center frequency Fn of the noise signal N is higher than the center frequency FL of the local signal SL (Fn>FL) is described. An issue which will be described below similarly happens even in the case where the center frequency Fn of the noise signal N is lower than the center frequency FL of the local signal SL (Fn<FL).

FIG. 4 illustrates, as a receiver device 11 according to a comparison example, the configuration from which the filter 8 of the present disclosure is omitted. In the receiver device 11 of this comparison example, a signal SLn, in which the original local signal SL is mixed with the noise signal N propagated from the antenna 10, is input to the frequency multiplier 4. Here, for normal operation of the frequency multiplier 4, it is necessary to input a signal having a single frequency. However, as in the comparison example, in the case where the signal SLn including the original local signal SL and the noise signal N is input to the frequency multiplier 4, it means that a signal having not a single frequency but having two frequencies is input to the frequency multiplier 4.

At this time, intermodulation may occur in the frequency multiplier 4. Since the intermodulation has nonlinear properties, higher order intermodulation distortions are generated. In FIG. 4, of the higher order intermodulation distortions, an example of the second order intermodulation distortion is illustrated. That is to say, a signal Smn that has passed the frequency multiplier 4 includes the signal Sm obtained by multiplying the original local signal SL in frequency and an unwanted noise spectrum (N1 and N2) produced by intermodulation.

The frequency of noise N1 included in the signal Smn is equal to the value {Fm−(Fn−FL)} obtained by subtracting the difference (Fn−FL) between the center frequency Fn of the noise signal N and the center frequency FL of the local signal SL from the center frequency Fm of the signal Sm, and is 800 MHz, for example. Further, the frequency of noise N2 included in the signal Smn is equal to the value {Fm+(Fn−FL)} obtained by adding the difference (Fn−FL) between the center frequency Fn of the noise signal N and the center frequency FL of the local signal SL to the center frequency Fm of the signal Sm, and is 1.2 GHz, for example.

The signal Smn including this unwanted noise spectrum is input to the mixer 5 and is combined with the high frequency signal SH received by the antenna 2.

At this time, in a composite signal Scn that has passed the mixer 5, noises N3 to N6 are generated in addition to the original communication signals, which are the down-converted signal Sd and the up-converted signal Su. The noises N3 and N4 are generated in surrounding bands of the down-converted signal Sd. The noises N5 and N6 are generated in surrounding bands of the up-converted signal Su.

Here, the center frequency of the noise N3 is equal to the value {(FH−Fm)−(Fn−FL)} obtained by subtracting the difference (Fn−FL) between the center frequency Fn of the noise signal N and the center frequency FL of the local signal SL from the difference (FH−Fm) between the center frequency FH of the high frequency signal SH and the center frequency Fm of the signal Sm, which is obtained by multiplying the original local signal SL in frequency. For example, the center frequency of the noise N3 is 1.8 GHz. At this time, for example, the noise N3 has the same bandwidth X as the high frequency signal SH.

The center frequency of the noise N4 is equal to the value {(FH−Fm)+(Fn−FL)} obtained by adding the difference (Fn−FL) between the center frequency Fn of the noise signal N and the center frequency FL of the local signal SL to the difference (FH−Fm) between the center frequency FH of the high frequency signal SH and the center frequency Fm of the signal Sm. For example, the center frequency of the noise N4 is 2.2 GHz. At this time, for example, the noise N4 has the same bandwidth X as the high frequency signal SH.

Further, the center frequency of the noise N5 is equal to the value {(FH+Fm)−(Fn−FL)} obtained by subtracting the difference (Fn−FL) between the center frequency Fn of the noise signal N and the center frequency FL of the local signal SL from the sum (FH+Fm) of the center frequency FH of the high frequency signal SH and the center frequency Fm of the signal Sm. For example, the center frequency of the noise N5 is 3.8 GHz. At this time, for example, the noise N5 has the same bandwidth X as the high frequency signal SH.

The center frequency of the noise N6 is equal to the value {(FH+Fm)+(Fn−FL)} obtained by adding the difference (Fn−FL) between the center frequency Fn of the noise signal N and the center frequency FL of the local signal SL to the sum (FH+Fm) of the center frequency FH of the high frequency signal SH and the center frequency Fm of the signal Sm. For example, the center frequency of the noise N6 is 4.2 GHz. At this time, for example, the noise N6 has the same bandwidth X as the high frequency signal SH.

As is evident from FIG. 4, in the case where the bandwidth X is greater than the difference between the center frequency FL of the original local signal SL and the center frequency Fn of the noise signal N entered into the signal line of the local signal SL, that is to say, in the case where the condition X>(Fn−FL) holds, a noise band overlaps the original communication signal band.

Similarly, in the case where the center frequency Fn of the noise signal N is lower than the center frequency FL of the original local signal SL (Fn<FL) and the condition X>(FL−Fn) holds, the noise band overlaps the original communication signal band. That is to say, in the case (X>|Fn−FL|) where the bandwidth X is greater than the absolute value of the frequency difference ΔF between the center frequency Fn of the noise signal N and the center frequency FL of the original local signal SL, the noise band overlaps the original communication signal band.

In the case where this condition holds, the composite signal Smn in which the noise band overlaps the original communication signal band is transmitted to an integrated circuit (IC) such as the demodulation circuit 7 on the receiving side and the like. At this time, the IC on the receiving side demodulates data based on the composite signal Smn. However, the band pass filter 6 provided between the mixer 5 and the demodulation circuit 7 removes the up-converted signal Su and the noises N5 and N6 from the composite signal Smn. Therefore, the IC on the receiving side receives the noises N3 and N4 in addition to the down-converted signal Sd.

At this time, the IC on the receiving side recognizes the content of the high frequency signal SH as different data arrangement or data pattern due to the noises N3 and N4. That is to say, even when the down-converted signal Sd based on the high frequency signal SH is input, the IC on the receiving side recognizes the content of the high frequency signal SH as erroneous data because of the noises N3 and N4. In a case like this where a normal communication signal cannot be received, the IC on the receiving side requests the transmitting side to retransmit data. The repetition of such retransmissions reduces the communication speed at the antenna 2 and may lead to communication failure in the worst case.

On the other hand, in the present embodiment, the filter is provided between the local oscillator 3 and the frequency multiplier 4 to remove the noise signal N other than the local signal SL. Therefore, even if a wireless radio wave (a high frequency signal of 700 MHz) of the antenna 10 entered into the signal line connecting the local oscillator 3 and the frequency multiplier 4, the filter 9 can suppress the noise signal N in that wireless frequency band. As a result, the noise signal N will not be input to the frequency multiplier 4. In a case like this where the frequency band of the noise signal N is known in advance, it is preferable that a band stop filter capable of noise suppression in the wireless frequency band (for example, 700 MHz band) of the antenna 10 be formed. On the other hand, the original local signal SL is a signal necessary for communication, and thus it is necessary for the filter 8 to eliminate an influence on the local signal SL. Accordingly, the filter 8 needs to have a function of a band pass filter in the frequency band of the original local signal SL.

Figure 3:
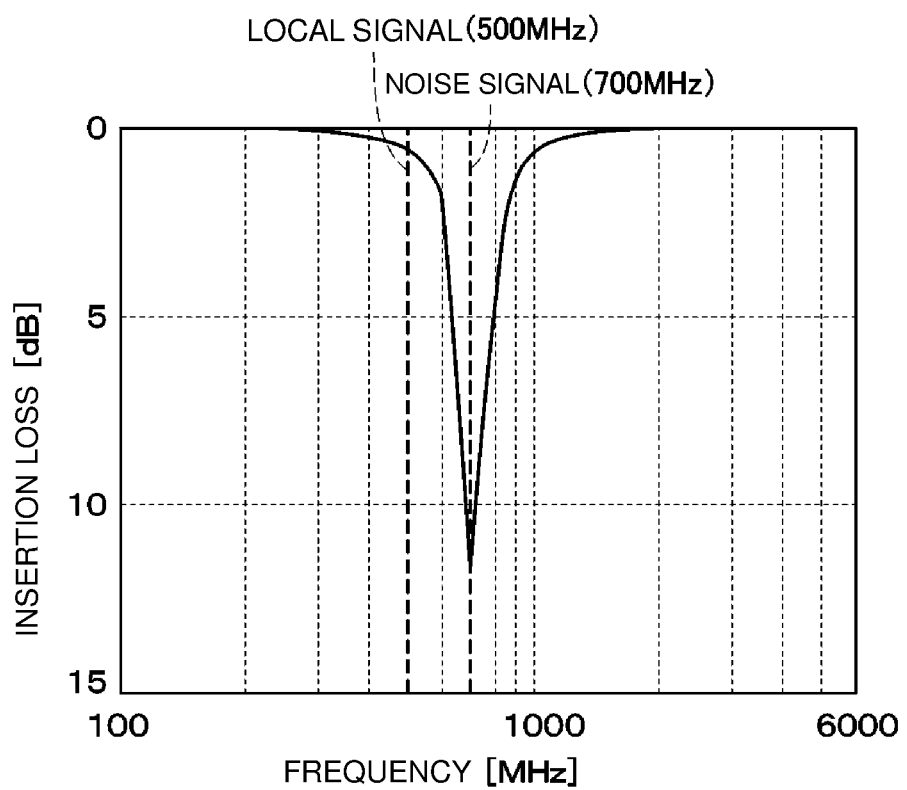
FIG. 3 is a characteristic line diagram illustrating a frequency characteristic of insertion loss of a filter in FIG. 2.

FIG. 2 illustrates the configuration of the filter 8 according to the present embodiment. The filter 8 according to the present embodiment is made up of a LC filter in which the inductive element Lp and the capacitive element Cp are connected in parallel to each other. At this time, the inductance of the inductive element Lp is, for example, 6 nH, and the capacitance of the capacitive element Cp is 8 pF. Note that these specific values are appropriately set depending on the center frequency FL of the original local signal SL and the center frequency Fn of the noise signal N. Specifically, the inductance of the inductive element Lp and the capacitance of the capacitive element Cp are appropriately selected in such a manner as to have a lower loss at the center frequency FL of the original local signal SL and have a higher loss at the center frequency Fn of the noise signal N. FIG. 3 illustrates a frequency characteristic of insertion loss by the filter 8 in FIG. 2. As illustrated in FIG. 3, the insertion loss of the filter 8 (LC filter) according to the present embodiment is 0.5 dB at 500 MHz, which is the center frequency FL of the original local signal SL, and is 11 dB at 700 MHz, which is the center frequency Fn of the noise signal N.

A communication test was performed after inserting the filter 8 illustrated in FIG. 2 in the signal line connecting the local oscillator 3 and the frequency multiplier 4. As a result, although wireless communication was unable to perform using the antenna 2 before the insertion of the filter 8, the wireless communication became possible after inserting the filter 8 according to the present embodiment. Further, it was also confirmed that the communication speed is equivalent to the original data transfer speed.

Thus, in the present embodiment, the filter 8 that removes the noise signal N whose frequency is different from that of the local signal SL is provided between the local oscillator 3 and the frequency multiplier 4. Therefore, the frequency multiplier 4 multiplies in frequency the local signal SL from which the noise signal N is removed, and this enables to suppress intermodulation distortions of the frequency multiplier 4 and prevent the occurrence of noise.

Further, when the frequency multiplier 4 multiplies in frequency the local signal SL in which the noise signal N is mixed, an unwanted noise spectrum is generated. In this case, when the condition (X>|ΔF|) that the absolute value of the frequency difference ΔF (ΔF=Fn−FL) between the center frequency FL of the local signal SL and the center frequency Fn of the noise signal N is less than the bandwidth X of the high frequency signal SH is satisfied, based on the unwanted noise spectrum output from the frequency multiplier 4, noise is further generated in an output from the mixer 5, and the noise band overlaps the band of the high frequency signal SH.

Whereas, the filter 8 removes the noise signal N that satisfies the condition that the absolute value of the frequency difference ΔF between the center frequency FL of the local signal SL and the center frequency Fn of the noise signal N is less than the bandwidth X of the high frequency signal SH. This enables to suppress the noise output from the mixer 5 and prevent the communication signal band from overlapping the noise band.

Note that it is not always necessary to remove the noise signal whose absolute value of the frequency difference ΔF is not greater than the bandwidth X of the high frequency signal SH. Even if the mixer generated noises based on such a noise signal, the communication signal band does not overlap the noise band, and the frequency bands of the communication signal (for example, the down-converted signal Sd) and the noise are separated from each other. This enables to remove the noises generated by the mixer 5 using, for example, the band pass filter or the like.

Further, because the frequency band of the noise signal N is known in advance, the filter 8 can be made up of a band stop filter. In this case, the band stop filter is configured in such a manner as to have a lower loss at the center frequency FL of the local signal SL and a higher loss at the center frequency Fn of the noise signal N. This enables the filter 8 made up of the band stop filter to allow the local signal SL to pass and remove the noise signal N. In addition, because the filter 8 is formed by combining the inductive element Lp and the capacitive element Cp, the filter 8 can be formed easily using passive elements.

In the present embodiment, the band stop filter of the filter 8 is configured to include the parallel resonant circuit 8A of the inductive element Lp and the capacitive element Cp. Therefore, by matching a resonant frequency of the parallel resonant circuit 8A to the center frequency Fn od the noise signal N, signal attenuation can be made larger in a band of the center frequency Fn, and signal attenuation can be made smaller in the other bands. Therefore, even in the case where the center frequency FL of the local signal SL is close to the center frequency Fn of the noise signal N, the filter 8 is able to allow the local signal SL to pass and remove the noise signal N.

Further, because the noise signal N is another high frequency signal SHn being used in wireless communication of a frequency band different from that of the high frequency signal SH, noise caused by the another high frequency signal SHn can be suppressed even in the case where the another high frequency signal SHn has the center frequency close to that of the local signal SL.

Figure 5:
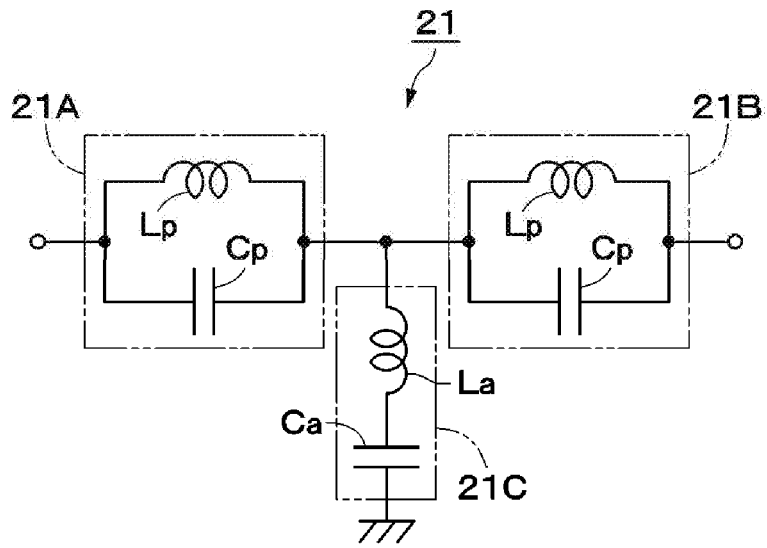
FIG. 5 is a circuit diagram illustrating a filter according to a first modification example.

Note that in the foregoing first embodiment, the filter 8 is configured to include the band stop filter made up of a single stage parallel resonant circuit 8A. However, the present disclosure is not limited to the above configuration, and the filter 8 may alternatively be made up of a band stop filter including a two-stage parallel resonant circuit, parallel resonant circuits 21A and 21B, like a filter 21 according to a first modification example illustrated in FIG. 5, for example. In this case, a series circuit 21C in which an inductive element La and a capacitive element Ca are connected in series is connected between a connection point of those two parallel resonant circuits 21A and 21B and ground. Similarly, the filter may be made up of a band stop filter including a parallel resonant circuit having three or more stages.

Figure 6:
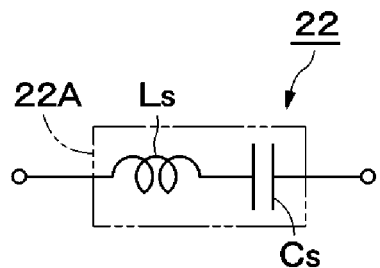
FIG. 6 is a circuit diagram illustrating a filter according to a second modification example.

Further, the filter 8 may be made up of a band pass filter (BPF) including a series resonant circuit 22A in which an inductive element Ls and a capacitive element Cs are connected in series, like a filter 22 according to a second modification example illustrated in FIG. 6. In this case, each of the inductance of the inductive element Ls and the capacitance of the capacitive element Cs is set in such a way that a resonant frequency of the series resonant circuit 22A matches the center frequency FL of the local signal SL.

Figure 7:
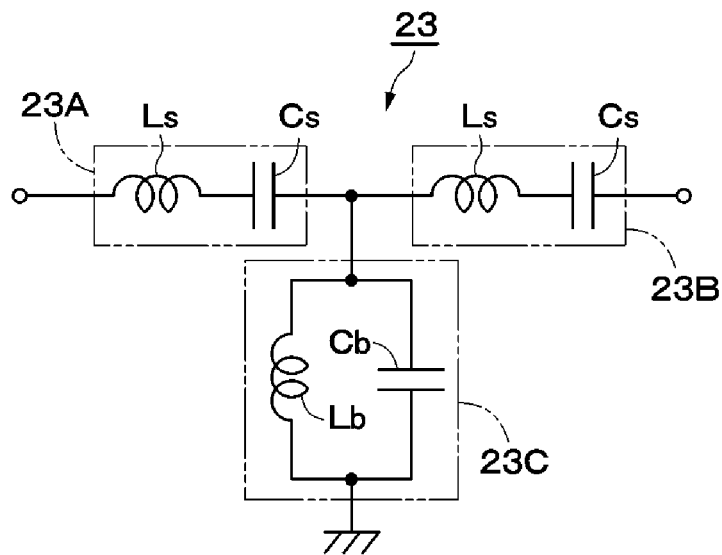
FIG. 7 is a circuit diagram illustrating a filter according to a third modification example.

Further, the filter 8 may alternatively be made up of a band pass filter including a two-stage series resonant circuit, series resonant circuits 23A and 23B, like a filter 23 according to a third modification example illustrated in FIG. 7, for example. In this case, a parallel circuit 23C in which an inductive element Lb and a capacitive element Cb are connected in parallel is connected between a connection point of those two series resonant circuits 23A and 23B and ground. Similarly, the filter may be made up of a band pass filter including a series resonant circuit having three or more stages.

Figure 8:
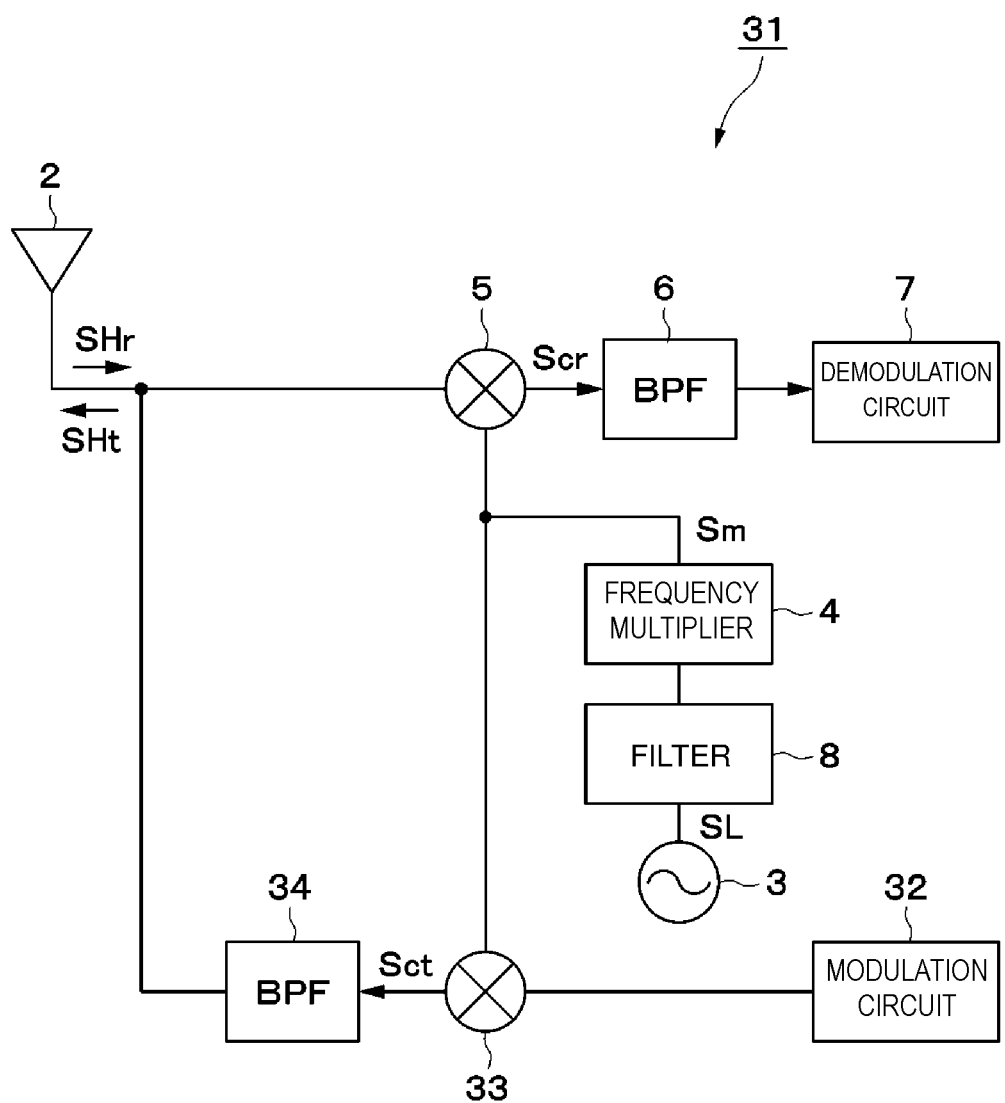
FIG. 8 is a block diagram illustrating a transceiver device according to a second embodiment of the present disclosure.

Next, FIG. 8 illustrates a second embodiment of the present disclosure. A characteristic feature of the second embodiment lies in the fact that the present disclosure is applied to a transceiver device that carries out both transmission and reception of high frequency signals as a wireless communication device. In the second embodiment, elements similar to those of the first embodiment described above are denoted by the same reference numbers, and the descriptions thereof are omitted.

As is the case with the first embodiment, a transceiver device 31 includes the antenna 2, the local oscillator 3, the frequency multiplier 4, the mixer 5 for receiving, the demodulation circuit 7, and the filter 8. In addition, the transceiver device 31 further includes a modulation circuit 32 and a mixer 33 for transmitting.

A receiving side part of the transceiver device 31 is configured substantially similar to the receiver device 1 according to the first embodiment. Therefore, the mixer 5 for receiving combines a high frequency signal SHr received by the antenna 2 with the signal Sm obtained by multiplying the local signal SL in frequency. This allows the mixer 5 to output a composite signal Scr including an up-converted signal and a down-converted signal. Of the composite signal Scr, the up-converted signal is removed by the band pass filter 6. Therefore, the demodulation circuit 7 demodulates the signal based on a low frequency signal (down-converted signal) obtained by down-converting the high frequency signal SHr.

A transmitting-side part of the transceiver device 31 is made up of the modulation circuit 32, the mixer 33 for transmitting, and the like. The modulation circuit 32 includes, for example, a DA converter and the like, and generates an intermediate frequency signal Si (low frequency signal) based on data for transmitting. At this time, the center frequency of the intermediate frequency signal Si is set at, for example, 2 GHz. The intermediate frequency signal Si has a preset bandwidth X (for example, 300 MHz).

The mixer 33 is connected to the antenna 2 and the frequency multiplier 4. In addition, the mixer 33 is further connected to the modulation circuit 32. The mixer 33 for transmitting is configured substantially similar to the mixer 5 for receiving. The mixer 33 combines the signal Sm output from the frequency multiplier 4 and the intermediate frequency signal Si output from the modulation circuit 32 and outputs a composite signal Sct. At this time, the composite signal Sct includes a down-converted signal Sd obtained by down-converting the intermediate frequency signal Si and an up-converted signal Su obtained by up-converting the intermediate frequency signal Si. The center frequency of the down-converted signal is, for example, 1 GHz, which is the value obtained by subtracting the difference between the center frequency of the intermediate frequency signal Si and the center frequency Fm of the signal Sm from the center frequency of the intermediate frequency signal Si. On the other hand, the center frequency of the up-converted signal is, for example, 3 GHz, which is the value obtained by adding the difference between the center frequency of the intermediate frequency signal Si and the center frequency Fm of the signal Sm to the center frequency of the intermediate frequency signal Si. Both the down-converted signal and the up-converted signal have the same bandwidth X.

The mixer 33 is connected to the antenna 2 via the band pass filter 34. The band pass filter 34 removes the unwanted down-converted signal from the composite signal Sct and outputs the up-converted signal to the antenna 2. Therefore, the mixer 33 for transmitting functions as an up-convert mixer that combines the intermediate frequency signal Si (low frequency signal) and the signal Sm obtained by multiplying the local signal SL in frequency and outputs a high frequency signal SHt obtained by up-converting the intermediate frequency signal Si. The antenna 2 transmits the high frequency signal SHt. At this time, the filter 8 removes the noise signal N that satisfies the condition that the absolute value of the frequency difference ΔF between the center frequency FL of the local signal SL and the center frequency Fn of the noise signal N is less than the bandwidth X of the high frequency signal SHt.

Note that a power amplifier that amplifies the power of the high frequency signal SHt may be provided between the antenna 2 and the band pass filter 34. Further, for example, an antenna duplexer, a circulator, or the like may be provided between the antenna 2 and the mixers 5 and 33 to isolate a signal for transmitting from a signal for receiving.

Thus, even with the second embodiment configured in such a manner as described above, functions and effects similar to the foregoing first embodiment can be obtained. The filter 8 is provided between the local oscillator 3 and the frequency multiplier 4 to remove the noise signal N other than the local signal SL. This enables to suppress intermodulation distortions of the frequency multiplier 4. As a result, because a signal in which a noise spectrum is reduced is input from the frequency multiplier 4 to the mixer 33, the noise output from the mixer 33 can be suppressed, and the overlapping of the communication signal band and the noise band can be prevented.

Note that in the first embodiment, the receiver device 1 is an exemplification of the wireless communication device and in the second embodiment, the transceiver device 31 is an exemplification of the wireless communication device. The present disclosure is not limited to these configurations, and the wireless communication device may alternatively be a transmitter device that only includes a transmitting function.

The foregoing embodiments are described using the wireless communication devices for use with millimeter waves as the examples. The present disclosure may also be applied to wireless communication devices for use with high frequency signals in other frequency bands such as, for example, microwaves.

Further, specific values of the frequency and the like described in each of the foregoing embodiments are mere examples, and the values are not limited to these specific values. These values may be appropriately set depending on, for example, the specification of a target device to which the present disclosure is applied.

Needless to say, each of the foregoing embodiments is for illustrative purposes only, and elements illustrated in different embodiments may be combined or partially exchanged.

Next, the disclosure included in the foregoing embodiment is described. The present disclosure is a wireless communication device including: an antenna that transmits or receives a high frequency signal having a preset bandwidth; a local oscillator that outputs a local signal, a center frequency of the local signal being lower than that of the high frequency signal; a frequency multiplier that multiplies the local signal in frequency, the frequency multiplier being electrically connected to the local oscillator; a mixer connected to the antenna and the frequency multiplier, wherein a filter is provided between the local oscillator and the frequency multiplier, the filter allowing the local signal to pass and removing a noise signal whose frequency is different from that of the local signal, and the filter removes the noise signal that satisfies a condition that an absolute value of a frequency difference between the center frequency of the local signal and the center frequency of the noise signal is less than the bandwidth of the high frequency signal. This enables to suppress intermodulation distortions of the frequency multiplier and prevent the occurrence of noise.

In the present disclosure, the filter is made up of a band pass filter or a band stop filter that allows the local signal to pass and removes the noise signal. In the case where the filter is the band pass filter, the band pass filter allows the local signal to pass and removes the noise signal whose frequency is different from that of the local signal. Further, in the case where the filter is the band stop filter, the band stop filter allows the local signal to pass and remove the noise signal.

In the present disclosure, the filter is formed by combining an inductive element and a capacitive element. Therefore, the filter can be easily formed using passive elements.

In the present disclosure, the band pass filter is configured to include a series resonant circuit of an inductive element and a capacitive element. Therefore, by matching a resonant frequency of the series resonant circuit to the center frequency of the local signal, the band pass filter is able to allow the local signal to pass and remove the noise signal. Further, the band stop filter is configured to include a parallel resonant circuit of an inductive element and a capacitive element. Therefore, by matching a resonant frequency of the parallel resonant circuit to the center frequency of the noise signal, the band stop filter is able to allow the local signal to pass and remove the noise signal.

In the present disclosure, the noise signal is another high frequency signal to be used for wireless communication in a frequency band different from that of the foregoing high frequency signal. This enables to suppress the noise caused by another high frequency signal even in the case where the another high frequency signal has the center frequency close to the local signal.

What is claimed is:

1. A wireless communication device comprising:
    an antenna configured to transmit or receive a high frequency signal having a preset bandwidth;
    a local oscillator configured to output a local signal, a center frequency of the local signal being lower than that of the high frequency signal;
    a frequency multiplier configured to multiply the local signal in frequency, the frequency multiplier being electrically connected to the local oscillator;
    a mixer connected to the antenna and the frequency multiplier; and
    a filter provided between the local oscillator and the frequency multiplier, the filter being configured to allow the local signal to pass and remove a noise signal whose frequency is different from that of the local signal, such that the filter is configured to remove the noise signal that satisfies a condition that an absolute value of a frequency difference between the center frequency of the local signal and the center frequency of the noise signal is less than the bandwidth of the high frequency signal.

2. The wireless communication device according to claim 1, wherein
    the filter includes a band pass filter or a band stop filter that is configured to allow the local signal to pass and remove the noise signal.

3. The wireless communication device according to claim 1, wherein
    the filter is configured as a combination of an inductive element and a capacitive element.

4. The wireless communication device according to claim 2, wherein
    the band pass filter includes a series resonant circuit of an inductive element and a capacitive element, and
    the band stop filter includes a parallel resonant circuit of an inductive element and a capacitive element.

5. The wireless communication device according to claim 1, wherein
    the noise signal is another high frequency signal being used for wireless communication in a frequency band different from that of the high frequency signal.

6. The wireless communication device according to claim 2, wherein
    the filter is configured as a combination of an inductive element and a capacitive element.

7. The wireless communication device according to claim 6, wherein
    the band pass filter includes a series resonant circuit of an inductive element and a capacitive element, and
    the band stop filter includes a parallel resonant circuit of an inductive element and a capacitive element.

8. The wireless communication device according to claim 2, wherein the noise signal is another high frequency signal being used for wireless communication in a frequency band different from that of the high frequency signal.

9. The wireless communication device according to claim 3, wherein
the noise signal is another high frequency signal being used for wireless communication in a frequency band different from that of the high frequency signal.

10. The wireless communication device according to claim 4, wherein
the noise signal is another high frequency signal being used for wireless communication in a frequency band different from that of the high frequency signal.

11. The wireless communication device according to claim 6, wherein
the noise signal is another high frequency signal being used for wireless communication in a frequency band different from that of the high frequency signal.

12. The wireless communication device according to claim 7, wherein
the noise signal is another high frequency signal being used for wireless communication in a frequency band different from that of the high frequency signal.

* * * * *